US011870122B2

(12) United States Patent
Wu et al.

(10) Patent No.: US 11,870,122 B2
(45) Date of Patent: Jan. 9, 2024

(54) LIQUID CRYSTAL PHASE SHIFTER AND ANTENNA

(71) Applicants: BEIJING BOE SENSOR TECHNOLOGY CO., LTD., Beijing (CN); BOE TECHNOLOGY GROUP CO., LTD., Beijing (CN)

(72) Inventors: Jie Wu, Beijing (CN); Tienlun Ting, Beijing (CN); Ying Wang, Beijing (CN); Liang Li, Beijing (CN); Haocheng Jia, Beijing (CN); Cuiwei Tang, Beijing (CN); Qiangqiang Li, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 413 days.

(21) Appl. No.: 17/309,614

(22) PCT Filed: Oct. 13, 2020

(86) PCT No.: PCT/CN2020/120646
§ 371 (c)(1),
(2) Date: Jun. 10, 2021

(87) PCT Pub. No.: WO2021/073505
PCT Pub. Date: Apr. 22, 2021

(65) Prior Publication Data

US 2022/0059913 A1 Feb. 24, 2022

(30) Foreign Application Priority Data

Oct. 17, 2019 (CN) ........................ 201910988096.X

(51) Int. Cl.
*H01P 1/18* (2006.01)
*H01P 3/08* (2006.01)
*H01Q 3/36* (2006.01)

(52) U.S. Cl.
CPC ................ *H01P 1/18* (2013.01); *H01P 1/184* (2013.01); *H01P 3/08* (2013.01); *H01Q 3/36* (2013.01)

(58) Field of Classification Search
CPC .. H01P 1/184; H01P 1/18; H01P 1/182; H01P 1/181; H01P 9/00; H03H 7/18; H01Q 3/36; H01Q 3/34
See application file for complete search history.

(56) References Cited

U.S. PATENT DOCUMENTS 9,835,924 B1 12/2017 Lee et al.
11,646,488 B2 * 5/2023 Wang ........................ H01P 1/18 333/161

(Continued)

FOREIGN PATENT DOCUMENTS

CN 106532200 A 3/2017
CN 106932947 A 7/2017

(Continued)

OTHER PUBLICATIONS

Office Action dated Jan. 12, 2021 issued in corresponding Chinese Application No. 201910988096.X.

(Continued)

*Primary Examiner* — Stephen E. Jones
(74) *Attorney, Agent, or Firm* — Nath, Goldberg & Meyer; Joshua B. Goldberg

(57) ABSTRACT

A liquid crystal phase shifter and an antenna are provided. The liquid crystal phase shifter includes: first and second substrates opposite to each other, a liquid crystal layer, a first electrode, and a second electrode that are between the first (Continued)

and second substrates, a first shielding electrode on a side of the first substrate distal to the liquid crystal layer, and a second shielding electrode on a side of the second substrate distal to the liquid crystal layer. The first and second electrodes generate an electric field when being provided with different voltages, respectively, to change a dielectric constant of the liquid crystal layer so as to adjust a phase shifting degree of a microwave signal. The first and second shielding electrodes shield radiation generated by the first and second electrodes when the different voltages are applied to the first and second electrodes, respectively.

20 Claims, 4 Drawing Sheets

(56) References Cited

U.S. PATENT DOCUMENTS

| | | | | |
|---|---|---|---|---|
| 2014/0022029 | A1 | 1/2014 | Glushchenko et al. | |
| 2021/0234268 | A1* | 7/2021 | Liu | G02F 1/1313 |

FOREIGN PATENT DOCUMENTS

| | | | |
|---|---|---|---|
| CN | 108196405 | A | 6/2018 |
| CN | 108321541 | A | 7/2018 |
| CN | 108511858 | A | 9/2018 |
| CN | 108563050 | A | 9/2018 |
| CN | 108710232 | A | 10/2018 |
| CN | 208654481 | U | 3/2019 |
| CN | 110233315 | A | 9/2019 |
| CN | 110707397 | A | 1/2020 |

OTHER PUBLICATIONS

Office Action dated Jun. 3, 2021 issued in corresponding Chinese Application No. 201910988096.X.

Office Action dated Oct. 18, 2021 issued in corresponding Chinese Application No. 201910988096.X.

* cited by examiner

LIQUID CRYSTAL PHASE SHIFTER AND ANTENNA

CROSS REFERENCE TO RELATED APPLICATIONS

This is a National Phase Application filed under 35 U.S.C. 371 as a national stage of PCT/CN2020/120646, filed Oct. 13, 2020, an application claiming the benefit of Chinese Application No. 201910988096.X, filed Oct. 17, 2019, the content of each of which is hereby incorporated by reference in its entirety.

TECHNICAL FIELD

The present disclosure relates to the field of communication technologies, and in particular to a liquid crystal phase shifter and an antenna.

BACKGROUND

A phase shifter is a device capable of adjusting (or changing) a phase of a microwave, and is widely applied to electronic communication systems. The phase shifter is a core component in each of a phased array radar, a synthetic aperture radar, a radar electronic countermeasure system, a satellite communication system, and a transceiver. Therefore, the phase shifter with a high performance will play a crucial role in these systems.

SUMMARY

A first aspect of the present disclosure provides a liquid crystal phase shifter, which includes: a first substrate and a second substrate opposite to each other, a liquid crystal layer, a first electrode, and a second electrode that are between the first substrate and the second substrate, a first shielding electrode on a side of the first substrate distal to the liquid crystal layer, and a second shielding electrode on a side of the second substrate distal to the liquid crystal layer, wherein the first electrode and the second electrode are configured to generate an electric field when being provided with different voltages, respectively, to change a dielectric constant of the liquid crystal layer so as to adjust a phase shifting degree of a microwave signal; and the first shielding electrode and the second shielding electrode are configured to shield radiation generated by the first electrode and the second electrode when the different voltages are applied to the first electrode and the second electrode, respectively.

In some embodiments, each of the first electrode and the second electrode includes a strip transmission line.

In some embodiments, the first electrode is on the first substrate, the second electrode is on the second substrate, and an orthographic projection of the first electrode on the first substrate and an orthographic projection of the second electrode on the first substrate at least partially overlap each other.

In some embodiments, the first electrode is on the first substrate, the second electrode is on the second substrate, and an orthographic projection of the first electrode on the first substrate and an orthographic projection of the second electrode on the first substrate do not overlap each other.

In some embodiments, both the first electrode and the second electrode are on the first substrate or the second substrate, and are spaced apart from each other.

In some embodiments, a distance between the first electrode and the second electrode in a horizontal direction is less than 2 times a width of the first electrode.

In some embodiments, the first substrate and the liquid crystal layer have therebetween a relationship of:

$$0.01 \leq \frac{\varepsilon_1 \times H_{LC}}{\varepsilon_{LC} \times H_{glass}} \leq 10,$$

where $\varepsilon_1$ is a dielectric constant of the first substrate, $\varepsilon_{LC}$ is a dielectric constant of the liquid crystal layer, $H_{glass}$ is a thickness of the first substrate, and $H_{LC}$ is a thickness of the liquid crystal layer.

In some embodiments, the liquid crystal phase shifter further includes a plurality of spacers between the first substrate and the second substrate for maintaining a thickness of the liquid crystal layer.

In some embodiments, the plurality of spacers are uniformly distributed between the first substrate and the second substrate.

In some embodiments, an orthographic projection of each of the plurality of spacers on the first substrate does not overlap an orthographic projection of the first electrode or the second electrode on the first substrate.

In some embodiments, the first passivation layer completely covers a surface of the first electrode proximal to the liquid crystal layer, side surfaces of the first electrode that are adjacent to the surface of the first electrode proximal to the liquid crystal layer, and a portion, which is not covered by the first electrode, of a surface of the first substrate proximal to the liquid crystal layer; and the second passivation layer completely covers a surface of the second electrode proximal to the liquid crystal layer, side surfaces of the second electrode that are adjacent to the surface of the second electrode proximal to the liquid crystal layer, and a portion, which is not covered by the second electrode, of a surface of the second substrate proximal to the liquid crystal layer.

In some embodiments, both the first electrode and the second electrode are on the second substrate; and the second passivation layer completely covers a surface of the first electrode proximal to the liquid crystal layer, a surface of the second electrode proximal to the liquid crystal layer, side surfaces of the first electrode that are adjacent to the surface of the first electrode proximal to the liquid crystal layer, side surfaces of the second electrode that are adjacent to the surface of the second electrode proximal to the liquid crystal layer, and a portion, which is not covered by the first electrode and the second electrode, of a surface of the second substrate proximal to the liquid crystal layer.

In some embodiments, the liquid crystal layer includes positive liquid crystal molecules or negative liquid crystal molecules;

in a case where the liquid crystal layer includes the positive liquid crystal molecules, an angle between a long axis direction of each of the positive liquid crystal molecules and a plane where the first substrate is located is greater than 0 degrees and less than or equal to 45 degrees; and in a case where the liquid crystal layer includes the negative liquid crystal molecules, an angle between a long axis direction of each of the negative liquid crystal molecules and the plane where the first substrate is located is greater than 45 degrees and less than 90 degrees.

In some embodiments, a dielectric constant in a long axis direction of each liquid crystal molecule of the liquid crystal layer is greater than a dielectric constant of each of the first substrate and the second substrate.

In some embodiments, a dielectric constant $\varepsilon_{//}$ in a long axis direction and a dielectric constant $\varepsilon_{\perp}$ in a short axis direction of each liquid crystal molecule of the liquid crystal layer satisfy an inequality of: $(\varepsilon_{//}-\varepsilon_{\perp})/\varepsilon_{//}>0.2$.

In some embodiments, each of the first shielding electrode and the second shielding electrode includes a ground electrode.

In some embodiments, a material of each of the first shielding electrode, the second shielding electrode, the first electrode, and the second electrode includes a metal.

In some embodiments, the metal includes aluminum, silver, gold, chromium, molybdenum, nickel, or iron.

In some embodiments, the liquid crystal layer has a thickness of 5 μm to 10 μm.

A second aspect of the present disclosure provides an antenna, which includes the liquid crystal phase shifter according to any one of the foregoing embodiments of the first aspect of the present disclosure.

DETAILED DESCRIPTION

Figure 1:
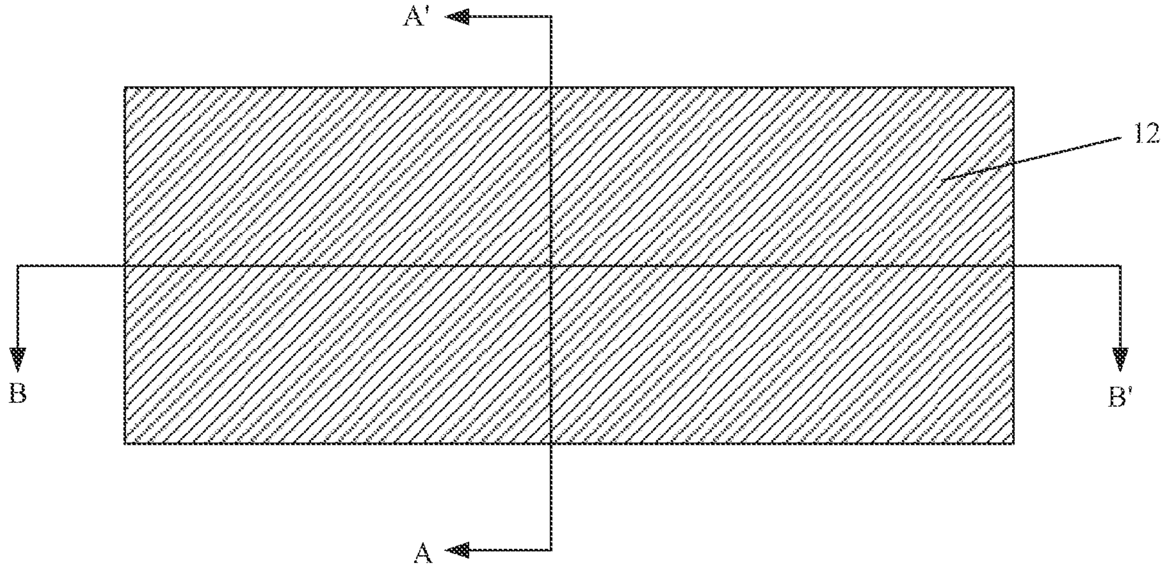
FIG. 1 is a schematic top view of a liquid crystal phase shifter according to an embodiment of the present disclosure.

To enable one of ordinary skill in the art to better understand technical solutions of the present disclosure, the present disclosure will be further described in detail below with reference to the accompanying drawings and exemplary embodiments.

Unless defined otherwise, technical or scientific terms used herein should have the same meaning as commonly understood by one of ordinary skill in the art to which the present disclosure belongs. The terms of “first”, “second”, and the like used in the present disclosure are not intended to indicate any order, quantity, or importance, but rather are used for distinguishing one element from another. Further, the term “a”, “an”, “the”, or the like used herein does not denote a limitation of quantity, but rather denote the presence of at least one element. The term of “comprising”, “including”, or the like, means that the element or item preceding the term contains the element or item listed after the term and the equivalent thereof, but does not exclude the presence of other elements or items. The terms “connected”, “coupled”, or the like is not limited to physical or mechanical connections, but may include electrical connections, whether direct or indirect connections. The terms “upper”, “lower”, “left”, “right”, and the like are used merely for indicating relative positional relationships, and when the absolute position of an object being described is changed, the relative positional relationships may also be changed accordingly.

The inventors of the present inventive concept have found that, a phase shifter in the related art has the disadvantages of large loss, long response time, large volume, etc., and cannot meet the requirement of the rapid development of electronic communication systems. For example, most phase shifters currently available on the market are a ferrite phase shifter and a positive-intrinsic-negative (PIN) diode phase shifter. For example, the ferrite phase shifter has the disadvantages of having a large volume and a slow response speed, and thus is not suitable for high-speed beam scanning. The PIN diode phase shifter has a disadvantage of high power consumption, and thus is not suitable for a lightweight, low-power-consumption phased array system. In addition, an electromagnetic radiation of the phase shifter in the related art is large and thus a loss of the transmitted microwave signal is large, and the electromagnetic radiation may interfere with a directional pattern and a sidelobe level (or side lobe level) of an antenna including the phase shifter.

The main idea of the present inventive concept is as follows. In embodiments of the present disclosure, an example is mainly taken in which a liquid crystal phase shifter is a stripline liquid crystal phase shifter. That is, the liquid crystal phase shifter includes: a first substrate and a second substrate disposed opposite to each other, and a first electrode, a second electrode, and a liquid crystal layer that are located between the first substrate and the second substrate. For example, each of the first electrode and the second electrode is a strip transmission line, and when different voltages are applied to the first and second electrodes, respectively, an electric field is formed between the first and second electrodes. The electric field may change a rotation angle of liquid crystal molecules of the liquid crystal layer, thereby changing a dielectric constant (i.e., a permittivity) of the liquid crystal layer. In this way, different phase shifting degrees of a microwave signal can be achieved. It should be understood herein that, after the first electrode and the second electrode receive a microwave signal from a power feeding structure, differential signals are transmitted to ensure that the microwave signal can be phase-shifted between the first electrode and the second electrode, and to avoid the crosstalk problem between a signal on the first electrode and a signal on the second electrode.

In a first aspect, as shown in FIGS. 1 to 9, some embodiments of the present disclosure provide a liquid crystal phase shifter. The liquid crystal phase shifter includes: a first substrate 10 and a second substrate 20 disposed opposite to each other, and a first electrode 11, a second electrode 21, and a liquid crystal layer 30 between the first substrate 10 and the second substrate 20. Further, a first shielding electrode 12 is arranged on a side of the first substrate 10 distal to the liquid crystal layer 30, and a second shielding electrode 22 is arranged on a side of the second substrate 20 distal to the liquid crystal layer 30. For example, when different voltages are applied to the first electrode 11 and the second electrode 21, respectively, to generate an electric field between the first electrode 11 and the second electrode

21, the electric field drives molecules of the liquid crystal layer 30 to rotate to change the dielectric constant of the liquid crystal layer 30. Dielectric constants of the liquid crystal layer 30 are different, such that amounts of change in the phase (i.e., phase shifting degrees) of the microwave signal transmitted in the liquid crystal layer 30 are different, thereby adjusting the phase shifting degrees of the microwave signal. During the above operation, since the first shielding electrode 12 and the second shielding electrode 22 are arranged on the sides of the first substrate 10 and the second substrate 20 distal to the liquid crystal layer 30, respectively, radiation generated by the first electrode 11 and the second electrode 21 is limited between the first shielding electrode 12 and the second shielding electrode 22, thereby avoiding a loss of the transmitted microwave signal and preventing an antenna including the phase shifter according to the present embodiment from being interfered by the radiation.

Figure 2:
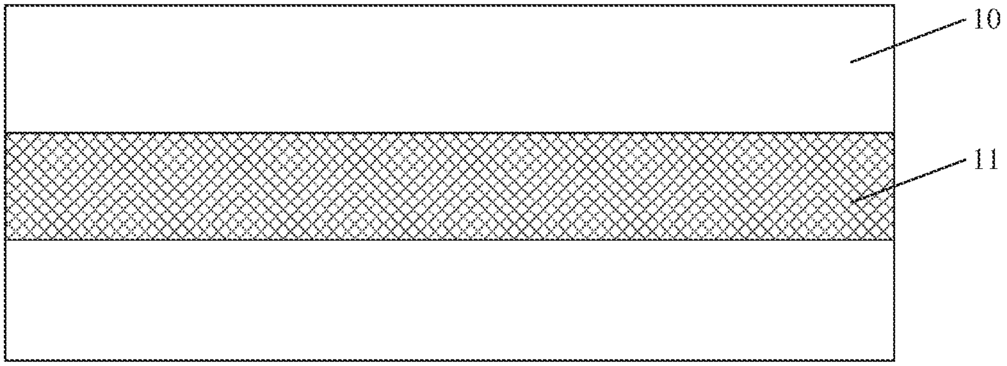
FIG. 2 is a schematic plan view of a side, which is proximal to a liquid crystal layer, of a first substrate of the liquid crystal phase shifter shown in FIG. 1.

For example, in some embodiments of the present disclosure, each of the first shielding electrode 12 and the second shielding electrode 22 may be a ground electrode (in other words, a potential on each of the first shielding electrode 12 and the second shielding electrode 22 may be a ground potential), to confine the radiation generated by the first electrode 11 and the second electrode 21 between the first shielding electrode 12 and the second shielding electrode 22. Further, the first electrode 11 may be a strip transmission line and have a shape of a rectangle in a plan view, as shown in FIG. 2. Similarly, the second electrode 21 may be a strip transmission line, and has a shape of a rectangle in a plan view.

In some embodiments of the present disclosure, as shown in FIGS. 1 to 5, the first electrode 11 of the liquid crystal phase shifter may be disposed on a side of the first substrate 10 proximal to the liquid crystal layer 30, and the second electrode 21 may be disposed on a side of the second substrate 20 proximal to the liquid crystal layer 30. Further, an orthographic projection of the first electrode 11 on the first substrate 10 (or the second substrate 20) and an orthographic projection of the second electrode 21 on the first substrate 10 (or the second substrate 20) completely overlap each other (in other words, the orthographic projections of the first electrode 11 and the second electrode 21 on a plane where a same one of the first substrate 10 and the second substrate 20 is located completely overlap each other). In this case, when different voltages are applied to the first electrode 11 and the second electrode 21, respectively, a vertical electric field (or a substantially vertical electric field) is generated between the first electrode 11 and the second electrode 21, such that the liquid crystal molecules of the liquid crystal layer 30 are rotated to change the dielectric constant of the liquid crystal layer 30, thereby changing a phase shifting degree of a microwave signal.

Figure 3:
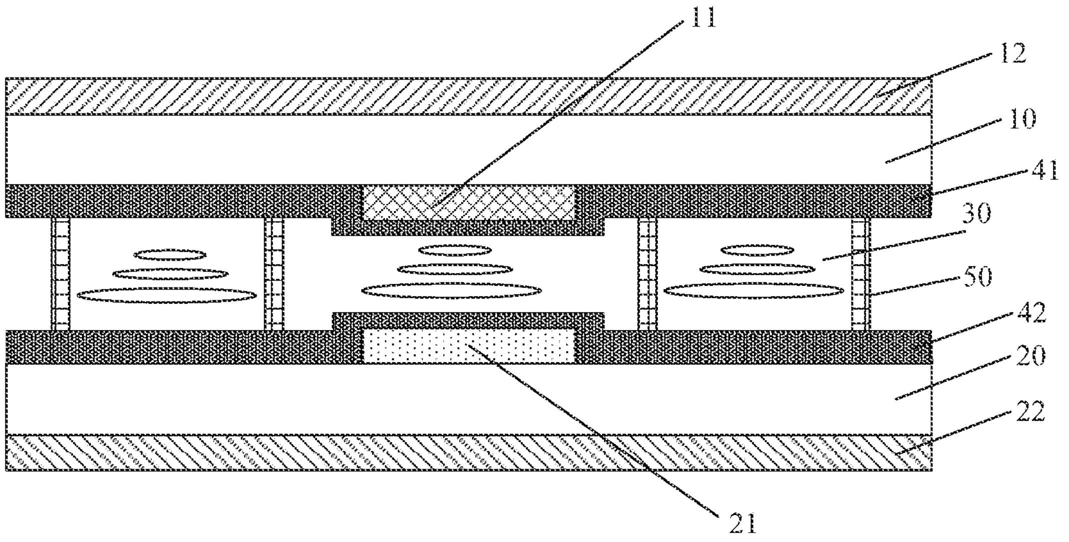
FIG. 3 is a schematic cross-sectional view of the liquid crystal phase shifter shown in FIG. 1 taken along a line A-A'.
Figure 7:
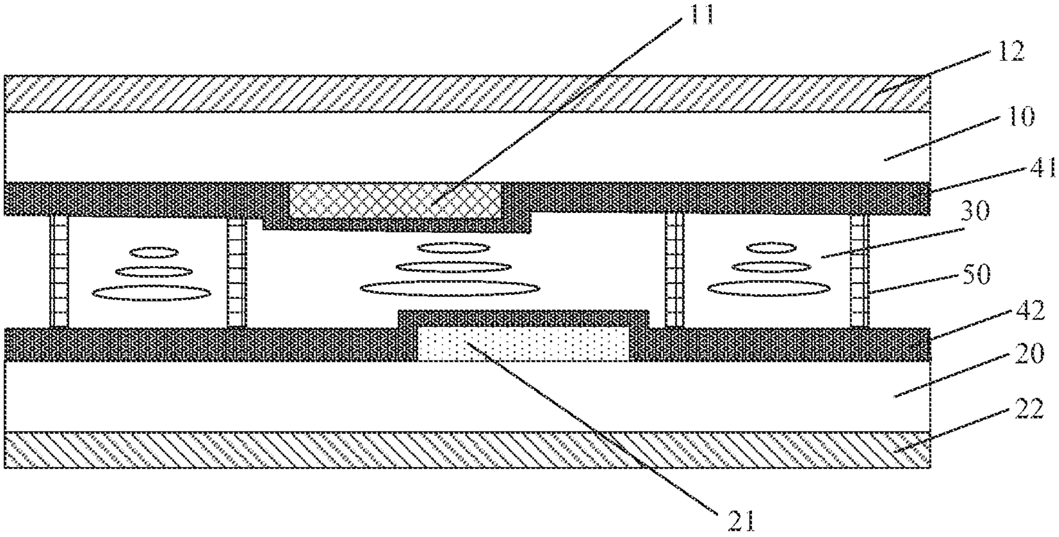
FIG. 7 is a schematic cross-sectional view of another liquid crystal phase shifter according to an embodiment of the present disclosure.
Figure 8:
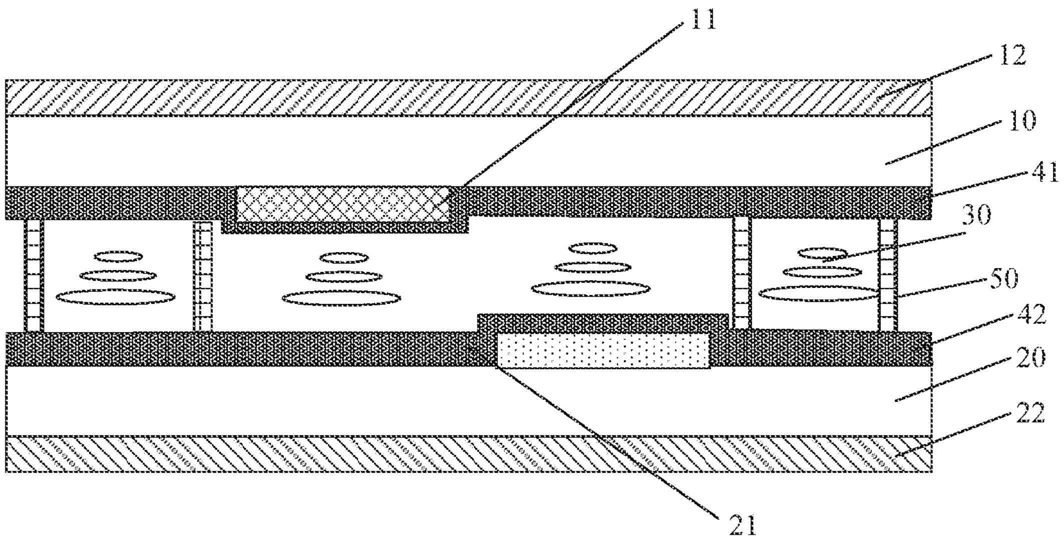
FIG. 8 is a schematic cross-sectional view of yet another liquid crystal phase shifter according to an embodiment of the present disclosure.

It is to be understood that, in order to protect signal lines (e.g., the first electrode 11 and the second electrode 21) respectively on the first substrate 10 and the second substrate 20, a first passivation layer 41 may be disposed on a side of the first electrode 11 proximal to the liquid crystal layer 30, and a second passivation layer 42 may be disposed on a side of the second electrode 21 proximal to the liquid crystal layer 30. In some embodiments, as shown in FIGS. 3, 7 and 8, the first passivation layer 41 may completely cover a surface of the first electrode 11 proximal to the liquid crystal layer 30, side surfaces of the first electrode 11 adjacent to the surface of the first electrode 11 proximal to the liquid crystal layer 30, and a portion, which is not covered by the first electrode 11, of the surface of the first substrate 10 proximal to the liquid crystal layer 30. Similarly, the second passivation layer 42 may completely cover a surface of the second electrode 21 proximal to the liquid crystal layer 30, side surfaces of the second electrode 21 adjacent to the surface of the second electrode 21 proximal to the liquid crystal layer 30, and a portion, which is not covered by the second electrode 21, of the surface of the second substrate 20 proximal to the liquid crystal layer 30.

Figure 4:
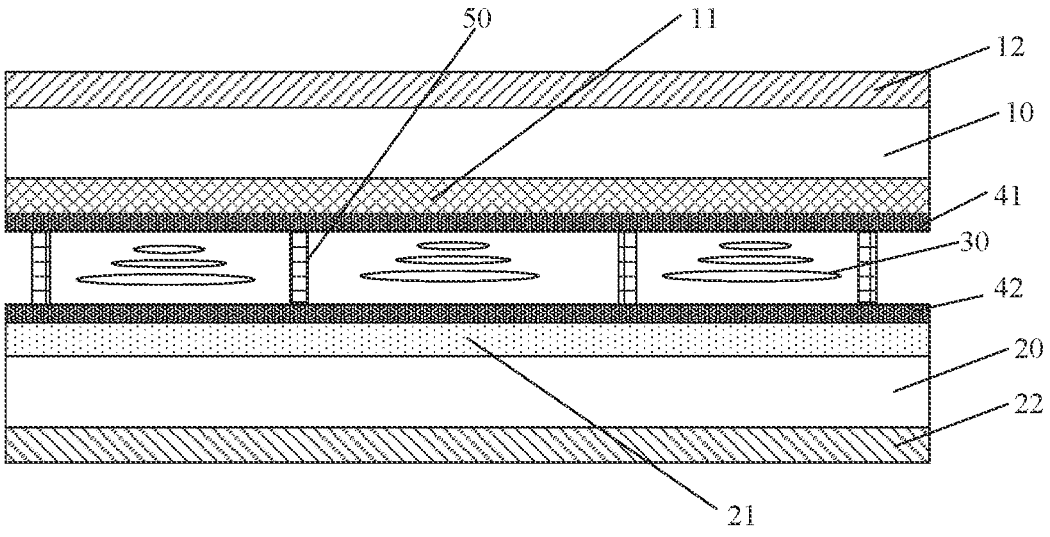
FIG. 4 is a schematic cross-sectional view of the liquid crystal phase shifter shown in FIG. 1 taken along a line B-B'.
Figure 5:
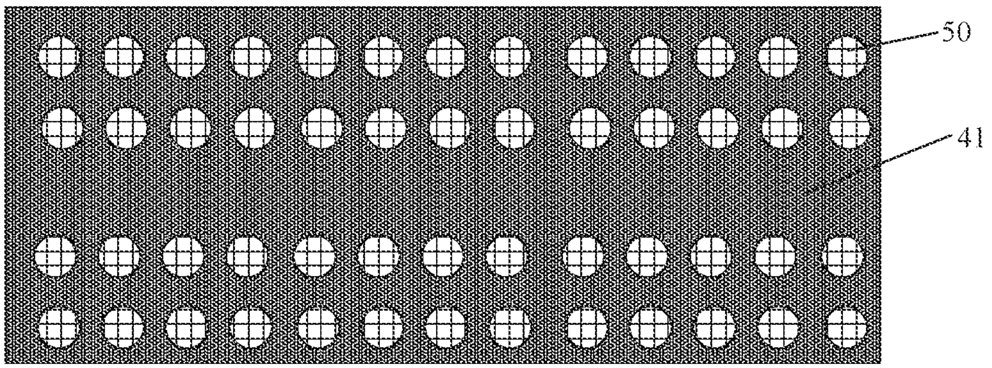
FIG. 5 is a schematic top view of a side, which is proximal to a first passivation layer, of a spacer of the liquid crystal phase shifter shown in FIG. 1.

In some embodiments of the present disclosure, as shown in FIG. 4, in order to maintain a thickness of the liquid crystal layer 30 (e.g., the maximum thickness of the liquid crystal layer 30 between the first passivation layer 41 and the second passivation layer 42), a plurality of spacers 50 may be further disposed between the first substrate 10 and the second substrate 20. For example, the plurality of spacers 50 are uniformly arranged. FIG. 5 is a schematic top view of sides, which are proximal to the first passivation layer 41, of the plurality of spacers 50 of the liquid crystal phase shifter. As shown in FIG. 5, end portions of the plurality of spacers 50 are uniformly disposed on the first passivation layer 41. In an example, an orthographic projection of each of the plurality of spacers 50 on the first substrate 10 does not cover the first electrode 11, and an orthographic projection of each of the plurality of spacers 50 on the second substrate 20 does not cover the second electrode 21. In other words, the orthographic projection of each of the plurality of spacers 50 on the first substrate 10 does not overlap the orthographic projection of the first electrode 11 or the second electrode 21 on the first substrate 10. In this way, it can be ensured that the plurality of spacers 50 have a same height (e.g., a dimension in the vertical direction in FIGS. 3 and 4), thereby reducing the difficulty in manufacturing the liquid crystal phase shifter.

Figure 6:
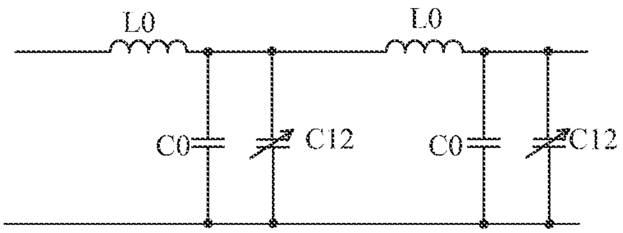
FIG. 6 is an equivalent circuit diagram of the liquid crystal phase shifter shown in FIG. 1.

In some embodiments of the present disclosure, a thickness and a material of the first substrate 10 may be the same as a thickness and a material of the second substrate 20, respectively. The first substrate 10 (or the second substrate 20) and the liquid crystal layer 30 should have the following relationship therebetween to ensure a designed value of the phase shifting degree of the liquid crystal phase shifter according to the present embodiment. The relationship is as follows:

$$0.01 \leq \frac{\varepsilon_1 \times H_{LC}}{\varepsilon_{LC} \times H_{glass}} \leq 10,$$

Where $\varepsilon_1$ is a dielectric constant of the first substrate 10 or the second substrate 20, $\varepsilon_{LC}$ is a dielectric constant of the liquid crystal layer 30, $H_{glass}$ is a thickness of the first substrate 10 or the second substrate 20 (e.g., a dimension of the first substrate 10 or the second substrate 20 in the vertical direction in FIG. 3 or 4), and $H_{LC}$ is the thickness of the liquid crystal layer. FIG. 6 is an equivalent circuit diagram of the liquid crystal phase shifter shown in FIG. 3. As shown in FIG. 6, for example, a circuit between one of the first electrode 11 and the second electrode 21 and the ground electrode (i.e., the first shielding electrode 12 or the second shielding electrode 22) may be equivalent to an inductance L0 per unit length and a capacitance C0 per unit length, a coupling capacitance generated between the first electrode 11 and the second electrode 21 may be equivalent to a capacitance C12, and a magnitude of the capacitance C12 depends on a medium filled between the first electrode 11 and the second electrode 21. When different voltages are applied to the first electrode 11 and the second electrode 21, respectively, an electric field generated between the first electrode 11 and the second electrode 21 causes the liquid crystal layer 30 to have the dielectric constant $\varepsilon_{LC}$ corresponding to the electric field. Since the dielectric constant $\varepsilon_{LC}$ of the liquid crystal layer 30 between the first electrode 11 and the second electrode 21 is changed, the coupling capacitance C12 between the first electrode 11 and the second electrode 21 is changed accordingly. A phase velocity Vp of the microwave signal transmitted on the transmission line may be determined to the following formula:

$$V_P = \frac{1}{\sqrt{L_0(C_0 + C_{12})}}.$$

As can be seen from the above formula, different coupling capacitances C12 result in different phase velocities Vp (i.e., result in a phase difference) for a same length of the transmission line. In this way, a phase shift of the microwave signal is achieved.

As shown in FIG. 7, some embodiments of the present disclosure provide another liquid crystal phase shifter. A structure of the liquid crystal phase shifter shown in FIG. 7 is similar to that of the liquid crystal phase shifter according to the above-described embodiments (e.g., the embodiments shown in FIGS. 1 to 4), and differences between them lie in that: in the liquid crystal phase shifter shown in FIG. 7, the first electrode 11 is disposed on the side of the first substrate 10 proximal to the liquid crystal layer 30, and the second electrode 21 is disposed on the side of the second substrate 20 proximal to the liquid crystal layer 30; further, the orthographic projection of the first electrode 11 on the first substrate 10 (or the second substrate 20) and the orthographic projection of the second electrode 21 on the first substrate 10 (or the second substrate 20) partially overlap each other. An operation principle of the phase shifter shown in FIG. 7 is the same as that of the above-described phase shifter, and detailed description thereof is omitted herein.

In the liquid crystal phase shifter shown in FIG. 7, an overlapping area of the orthographic projection of the first electrode 11 on the first substrate 10 (or the second substrate 20) and the orthographic projection of the second electrode 21 on the first substrate 10 (or the second substrate 20) may be set according to a desired phase shifting degree of the liquid crystal phase shifter.

As shown in FIG. 8, some embodiments of the present disclosure provide a liquid crystal phase shifter. A structure of the liquid crystal phase shifter shown in FIG. 8 is similar to that of the liquid crystal phase shifter according to the above-described embodiments (e.g., the embodiments shown in FIGS. 1 to 4), and differences between them lie in that: in the liquid crystal phase shifter shown in FIG. 8, the first electrode 11 is disposed on the side of the first substrate 10 proximal to the liquid crystal layer 30, and the second electrode 21 is disposed on the side of the second substrate 20 proximal to the liquid crystal layer 30, further, the orthographic projection of the first electrode 11 on the first substrate 10 (or the second substrate 20) and the orthographic projection of the second electrode 21 on the first substrate 10 (or the second substrate 20) do not overlap each other. In this case, when different voltages are applied to the first electrode 11 and the second electrode 21, respectively, a fringe electric field is formed between the first electrode 11 and the second electrode 21 to rotate the liquid crystal molecules of the liquid crystal layer 30, thereby changing the dielectric constant of the liquid crystal layer 30. In this way, the phase shifting degree of the microwave signal can also be changed.

In some embodiments of the present disclosure, in a case where the first electrode 11 is disposed on the first substrate 10 and the second electrode 21 is disposed on the second substrate 20, a distance between the first electrode 11 and the second electrode 21 in the horizontal direction includes, but is not limited to, being less than 2 times a width of the first electrode 11 (e.g., a dimension of the first electrode 11 in the vertical direction shown in FIG. 2), to ensure that an electric field can be formed between the first electrode 11 and the second electrode 21 when different voltages are applied to the first electrode 11 and the second electrode 21, respectively. The distance between the first electrode 11 and the second electrode 21 in the horizontal direction means: a distance between the side surface of the first electrode 11 proximal to the second electrode 21 and the side surface of the second electrode 21 proximal to the first electrode 11. In other words, the distance between the first electrode 11 and the second electrode 21 in the horizontal direction refers to: a distance between the right side surface of the first electrode 11 and the left side surface of the second electrode 21, as shown in FIG. 8. It should be noted that, in the above-described embodiments of the present disclosure, the width of the first electrode 11 is considered to be the same as a width of the second electrode 21, but the present disclosure is not limited thereto. For example, the widths of the first electrode 11 and the second electrode 21 may be different.

Figure 9:
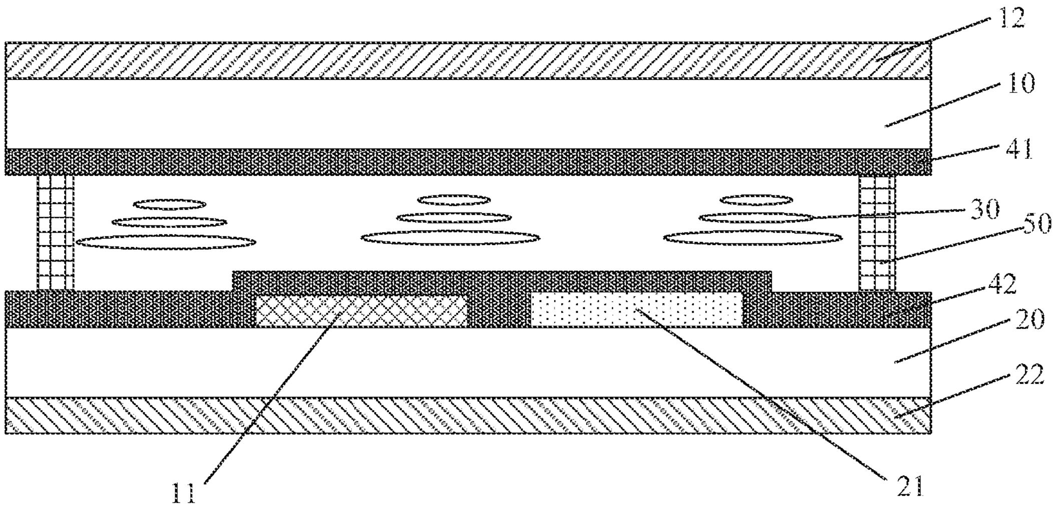
FIG. 9 is a schematic cross-sectional view of still another liquid crystal phase shifter according to an embodiment of the present disclosure.

As shown in FIG. 9, some embodiments of the present disclosure provide still another liquid crystal phase shifter. A structure of the liquid crystal phase shifter shown in FIG. 9 is similar to that of the liquid crystal phase shifter of the above-described embodiments (e.g., the embodiments shown in FIGS. 1 to 4, the embodiment shown in FIG. 7, and the embodiment shown in FIG. 8), and differences between them lie in that: in the liquid crystal phase shifter shown in FIG. 9, both the first electrode 11 and the second electrode 21 may be disposed on a same substrate, i.e., both the first electrode 11 and the second electrode 21 are disposed on the first substrate 10 or the second substrate 20. In this case, when different voltages are applied to the first electrode 11 and the second electrode 21, respectively, a horizontal electric field is formed between the first electrode 11 and the second electrode 21 to rotate the liquid crystal molecules of the liquid crystal layer 30, thereby changing the dielectric constant of the liquid crystal layer 30. In this way, the phase shifting degree of the microwave signal can also be changed. Further, as shown in FIG. 9, in the case where both the first electrode 11 and the second electrode 21 are disposed on the second substrate 20, the second passivation layer 42 may completely cover a surface of the first electrode 11 proximal to the liquid crystal layer 30, the surface of the second electrode 21 proximal to the liquid crystal layer 30, the side surfaces of the first electrode 11 adjacent to the surface of the first electrode 11 proximal to the liquid crystal layer 30, the side surfaces of the second electrode 21 adjacent to the surface of the second electrode 21 proximal to the liquid crystal layer 30, and a portion, which is not covered by the first electrode 11 and the second electrode 21, of the surface of the second substrate 20 proximal to the liquid crystal layer 30. In other words, the second passivation layer 42 may be filled in a gap between the first electrode 11 and the second electrode 21 to electrically insulate the first electrode 11 and the second electrode 21 from each other. In addition, each of the first passivation layer 41 and the second passivation layer 42 may be made of an insulating material.

For example, in the liquid crystal phase shifter shown in FIG. 9, the distance between the first electrode 11 and the second electrode 21 in the horizontal direction includes, but is not limited to, being less than 2 times the width of the first electrode 11, to ensure that an electric field can be formed between the first electrode 11 and the second electrode 21 when different voltages are applied to the first electrode 11 and the second electrode 21, respectively. It should be noted that, in the above-described embodiments of the present disclosure, the widths of the first electrode 11 and the second electrode 21 are considered to be the same, but the present disclosure is not limited thereto. For example, the widths of the first electrode 11 and the second electrode 21 may be different.

In some embodiments of the present disclosure, each of the first substrate 10 and the second substrate 20 may be a glass substrate having a thickness of 100 μm to 1,000 μm, or a sapphire substrate (a thickness of which may also be 100 μm to 1,000 μm), or one of a polyethylene terephthalate substrate, a triallyl cyanurate substrate, and a transparent flexible polyimide substrate that each have a thickness of 10 μm to 500 μm. As such, a loss of a microwave transmitted by the liquid crystal phase shifter can be effectively reduced, and the phase shifter has a low power consumption and a high signal-to-noise ratio.

Alternatively, each of the first substrate 10 and the second substrate 20 may include high-purity quartz glass having an extremely low dielectric loss. For example, the high-purity quartz glass may refer to quartz glass in which a weight percentage of $SiO_2$ is greater than or equal to 99.9%. Compared with a general glass substrate, the first substrate 10 and/or the second substrate 20 being high-purity quartz glass substrate(s) can effectively reduce the loss of the microwave transmitted by the liquid crystal phase shifter, and thus the phase shifter has a lower power consumption and a higher signal-to-noise ratio.

In some embodiments of the present disclosure, a material of the first electrode 11 may include a metal, and for example, the metal may be aluminum, silver, gold, chromium, molybdenum, nickel, iron, or the like.

In some embodiments of the present disclosure, a material of the second electrode 21 may include a metal, and for example, the metal may be aluminum, silver, gold, chromium, molybdenum, nickel, iron, or the like.

In some embodiments of the present disclosure, a material of the first shielding electrode 12 may include a metal, and for example, the metal may be aluminum, silver, gold, chromium, molybdenum, nickel, iron, or the like.

In some embodiments of the present disclosure, a material of the second shielding electrode 22 may include a metal, and for example, the metal may be aluminum, silver, gold, chromium, molybdenum, nickel, iron, or the like.

In some embodiments of the present disclosure, the liquid crystal molecules of the liquid crystal layer 30 may be positive liquid crystal molecules or negative liquid crystal molecules. It should be noted that, in a case where the liquid crystal molecules are the positive liquid crystal molecules, in the embodiment of the present disclosure, an angle between a long axis direction of each liquid crystal molecule and a plane where the second electrode 21 (or the first electrode 11 or the first substrate 10 or the second substrate 20) is located is greater than 0° and less than or equal to 45°. In a case where the liquid crystal molecules are the negative liquid crystal molecules, in the embodiment of the present disclosure, an angle between the long axis direction of each liquid crystal molecule and the plane where the second electrode 21 (or the first electrode 11 or the first substrate 10 or the second substrate 20) is located is greater than 45° and less than 90°. As such, it can be ensured that a propagation constant of a microwave is adjusted more effectively after the liquid crystal molecules are rotated, thereby achieving the purpose of shifting (or changing) the phase of the microwave.

In some embodiments of the present disclosure, in order to more effectively adjust the propagation constant of the microwave after the liquid crystal molecules are rotated, a dielectric constant of each liquid crystal molecule in the long axis direction of the liquid crystal molecule may be greater than a dielectric constant of each of the first substrate 10 and the second substrate 20. For example, a material of the liquid crystal molecules may be selected according to the practical requirements of a liquid crystal phase shifter and the cost for the material.

In some embodiments of the present disclosure, the dielectric constant $\varepsilon_{//}$ in the long axis direction and a dielectric constant $\varepsilon_{\perp}$ in a short axis direction of each liquid crystal molecule of the liquid crystal layer 30 may satisfy the following inequality: $(\varepsilon_{//}-\varepsilon_{\perp})\varepsilon_{//}>0.2$. As such, a length (e.g., a dimension in the horizontal direction in FIG. 2) of each of the first electrode 11 and the second electrode 21 may be small, thereby effectively reducing the loss of the microwave signal while being transmitted on each of the first electrode 11 and the second electrode 21.

In some embodiments of the present disclosure, the thickness of the liquid crystal layer 30 is not greater than 10 μm, and for example, the thickness of the liquid crystal layer 30 includes, but is not limited to, being in a range of 5 μm to 10 μm, to ensure that a response speed of the liquid crystal layer 30 is fast enough.

In a second aspect, an embodiment of the present disclosure provides an antenna, which includes the liquid crystal phase shifter according to any one of the foregoing embodiments of the present disclosure. In a practical application, the antenna may further include a carrier unit such as a carrier plate, and the liquid crystal phase shifter may be disposed on the carrier plate, which is not limited in the present embodiment.

It should be noted that, the number of the liquid crystal phase shifters included in the antenna may be determined according to the requirements of a practical application, and is not limited in an embodiment of the present disclosure. In other words, the antenna provided by the present disclosure may include one or more liquid crystal phase shifters provided by the present disclosure.

As described above, the advantages of the liquid crystal phase shifter provided by the present disclosure include at least having a low loss of a microwave signal, a low electromagnetic radiation, and suitability for integration in an antenna or another device. In addition, the advantages of the antenna provided by the present disclosure include at least having a low loss of a microwave signal, a low electromagnetic radiation, and a very small possibility that the directional pattern and the sidelobe level of the antenna are interfered.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the scope of the present disclosure as defined in the appended claims, and such changes and modifications also fall within the scope of the present disclosure.

What is claimed is:

1. A liquid crystal phase shifter, comprising: a first substrate and a second substrate opposite to each other, a liquid crystal layer, a first electrode, and a second electrode that are between the first substrate and the second substrate, a first shielding electrode on a side of the first substrate distal to the liquid crystal layer, and a second shielding electrode on a side of the second substrate distal to the liquid crystal layer, wherein the first electrode and the second electrode are configured to generate an electric field when being provided with different voltages, respectively, to change a dielectric constant of the liquid crystal layer so as to adjust a phase shifting degree of a microwave signal; and the first shielding electrode and the second shielding electrode are configured to shield radiation generated by the first electrode and the second electrode when the different voltages are applied to the first electrode and the second electrode, respectively.

2. The liquid crystal phase shifter according to claim 1, wherein the first substrate and the liquid crystal layer have therebetween a relationship of:

$$0.01 \leq \frac{\varepsilon_1 \times H_{LC}}{\varepsilon_{LC} \times H_{glass}} \leq 10,$$

where $\varepsilon_1$ is a dielectric constant of the first substrate, $\varepsilon_{LC}$ is a dielectric constant of the liquid crystal layer, $H_{glass}$ is a thickness of the first substrate, and $H_{LC}$ is a thickness of the liquid crystal layer.

3. The liquid crystal phase shifter according to claim 1, wherein the liquid crystal layer comprises positive liquid crystal molecules or negative liquid crystal molecules;

in a case where the liquid crystal layer comprises the positive liquid crystal molecules, an angle between a long axis direction of each of the positive liquid crystal molecules and a plane where the first substrate is located is greater than 0 degrees and less than or equal to 45 degrees; and in a case where the liquid crystal layer comprises the negative liquid crystal molecules, an angle between a long axis direction of each of the negative liquid crystal molecules and the plane where the first substrate is located is greater than 45 degrees and less than 90 degrees.

4. The liquid crystal phase shifter according to claim 1, wherein a dielectric constant in a long axis direction of each liquid crystal molecule of the liquid crystal layer is greater than a dielectric constant of each of the first substrate and the second substrate.

5. The liquid crystal phase shifter according to claim 1, wherein a dielectric constant £ii in a long axis direction and a dielectric constant $\varepsilon_\perp$ in a short axis direction of each liquid crystal molecule of the liquid crystal layer satisfy an inequality of: $(\varepsilon_{//}-\varepsilon_\perp)/\varepsilon_{//}>0.2$.

6. The liquid crystal phase shifter according to claim 1, wherein each of the first shielding electrode and the second shielding electrode comprises a ground electrode.

7. The liquid crystal phase shifter according to claim 1, wherein the liquid crystal layer has a thickness of 5 μm to 10 μm.

8. An antenna, comprising the liquid crystal phase shifter according to claim 1.

9. The liquid crystal phase shifter according to claim 1, wherein a material of each of the first shielding electrode, the second shielding electrode, the first electrode, and the second electrode comprises a metal.

10. The liquid crystal phase shifter according to claim 9, wherein the metal comprises aluminum, silver, gold, chromium, molybdenum, nickel, or iron.

11. The liquid crystal phase shifter according to claim 1, further comprising a plurality of spacers between the first substrate and the second substrate for maintaining a thickness of the liquid crystal layer.

12. The liquid crystal phase shifter according to claim 11, wherein the plurality of spacers are uniformly distributed between the first substrate and the second substrate.

13. The liquid crystal phase shifter according to claim 12, wherein an orthographic projection of each of the plurality of spacers on the first substrate does not overlap an orthographic projection of the first electrode or the second electrode on the first substrate.

14. The liquid crystal phase shifter according to claim 1, wherein each of the first electrode and the second electrode comprises a strip transmission line.

15. The liquid crystal phase shifter according to claim 14, wherein the first electrode is on the first substrate, the second electrode is on the second substrate, and an orthographic projection of the first electrode on the first substrate and an orthographic projection of the second electrode on the first substrate at least partially overlap each other.

16. The liquid crystal phase shifter according to claim 15, further comprising a first passivation layer and a second passivation layer, wherein the first passivation layer completely covers a surface of the first electrode proximal to the liquid crystal layer, side surfaces of the first electrode that are adjacent to the surface of the first electrode proximal to the liquid crystal layer, and a portion, which is not covered by the first electrode, of a surface of the first substrate proximal to the liquid crystal layer; and the second passivation layer completely covers a surface of the second electrode proximal to the liquid crystal layer, side surfaces of the second electrode that are adjacent to the surface of the second electrode proximal to the liquid crystal layer, and a portion, which is not covered by the second electrode, of a surface of the second substrate proximal to the liquid crystal layer.

17. The liquid crystal phase shifter according to claim 14, wherein the first electrode is on the first substrate, the second electrode is on the second substrate, and an orthographic projection of the first electrode on the first substrate and an orthographic projection of the second electrode on the first substrate do not overlap each other.

18. The liquid crystal phase shifter according to claim 17, wherein a distance between the first electrode and the second electrode in a horizontal direction is less than 2 times a width of the first electrode.

19. The liquid crystal phase shifter according to claim 14, wherein both the first electrode and the second electrode are on the first substrate or the second substrate, and are spaced apart from each other.

20. The liquid crystal phase shifter according to claim 19, further comprising a second passivation layer, wherein both the first electrode and the second electrode are on the second substrate; and the second passivation layer completely covers a surface of the first electrode proximal to the liquid crystal layer, a surface of the second electrode proximal to the liquid crystal layer, side surfaces of the first electrode that are adjacent to the surface of the first electrode proximal to the liquid crystal layer, side surfaces of the second electrode that are adjacent to the surface of the second electrode proximal to the liquid crystal layer, and a portion, which is not covered by the first electrode and the second electrode, of a surface of the second substrate proximal to the liquid crystal layer.

* * * * *